(12) United States Patent
Falkenstein

(10) Patent No.: US 9,505,394 B2
(45) Date of Patent: Nov. 29, 2016

(54) METHOD AND DEVICE FOR CHANGING THE MECHANICAL COUPLING OF A DRIVE UNIT TO A POWER TRAIN OF A MOTOR VEHICLE, WHOSE POWER TRAIN IS EQUIPPED WITH AT LEAST TWO DRIVE UNITS

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 13/291,273

(22) Filed: Nov. 8, 2011

(65) Prior Publication Data

US 2012/0138405 A1 Jun. 7, 2012

(30) Foreign Application Priority Data

Dec. 2, 2010 (DE) .................. 10 2010 062 337

(51) Int. Cl.
| | | |
|---|---|---|
| *B60W 10/02* | (2006.01) | |
| *B60W 10/06* | (2006.01) | |
| *B60W 10/08* | (2006.01) | |
| *B60W 20/00* | (2016.01) | |
| *B60K 6/48* | (2007.10) | |
| *B60W 30/188* | (2012.01) | |

(52) U.S. Cl.
CPC ............. *B60W 10/02* (2013.01); *B60K 6/48* (2013.01); *B60W 10/06* (2013.01); *B60W 10/08* (2013.01); *B60W 20/00* (2013.01); *B60K 2006/4841* (2013.01); *B60W 30/1882* (2013.01); *B60W 2710/0666* (2013.01); *B60W 2710/083* (2013.01); *Y02T 10/6221* (2013.01); *Y02T 10/6286* (2013.01); *Y10T 74/19051* (2015.01)

(58) Field of Classification Search
CPC .... B60W 10/02; B60W 10/06; B60W 10/08; B60W 20/00; B60K 6/48
See application file for complete search history.

(56) References Cited

U.S. PATENT DOCUMENTS

| | | | | |
|---|---|---|---|---|
| 4,397,379 A | * | 8/1983 | Baudoin ............... | B60W 10/02 192/3.58 |
| 6,629,026 B1 | * | 9/2003 | Baraszu et al. ................. | 701/22 |
| 8,214,120 B2 | * | 7/2012 | Kothari et al. ................ | 701/70 |
| 2007/0080005 A1 | * | 4/2007 | Joe ............................... | 180/65.2 |

FOREIGN PATENT DOCUMENTS

| | | |
|---|---|---|
| CN | 101475000 A | 7/2009 |
| CN | 101522496 A | 9/2009 |
| DE | 10126348 | 1/2002 |

* cited by examiner

*Primary Examiner* — Jelani Smith
*Assistant Examiner* — Kelly D Williams
(74) *Attorney, Agent, or Firm* — Norton Rose Fulbright US LLP; Gerard Messina

(57) ABSTRACT

A method for changing a drive unit's mechanical coupling to a motor vehicle power train, which has at least two drive units, in which at least one first drive unit of the two drive units is coupled via various mechanical couplings, including mechanical transmission ratios, during the travel of the motor vehicle, a power or torque influence of the two drive units occurring if there is a change of the mechanical coupling. To ensure a change of the mechanical coupling without the vehicle occupants perceiving it, the change of the mechanical coupling of the first drive unit of the two drive units occurs in at least two operating modes, a first operating mode causing a slower operating point change with respect to time of the two drive units, while a more rapid operating point change as to time of the two drive units is provided in a second operating mode.

4 Claims, 4 Drawing Sheets

METHOD AND DEVICE FOR CHANGING THE MECHANICAL COUPLING OF A DRIVE UNIT TO A POWER TRAIN OF A MOTOR VEHICLE, WHOSE POWER TRAIN IS EQUIPPED WITH AT LEAST TWO DRIVE UNITS

CROSS REFERENCE

The present application claims the benefit under 35 U.S.C. §119 of German Patent Application No. DE 102010062337.7 filed on Dec. 2, 2010, which is expressly incorporated herein by reference in its entirety.

FIELD OF THE INVENTION

The present invention relates to a method for changing the mechanical coupling of a drive unit to a power train of a motor vehicle, whose power train is equipped with at least two drive units, in which at least a first of the two drive units is coupled on during the travel of the motor vehicle via different mechanical couplings, a power or torque influence of the two drive units taking place in the event of a change of the mechanical coupling, as well as a vehicle control unit and a transmission control unit for executing the method.

BACKGROUND INFORMATION

Conventional vehicles, in particular hybrid, electric, or hydraulic vehicles, may have at least two drive units, at least a first of the two drive units being able to be coupled to the power train via various mechanical couplings. Upon the change of this mechanical coupling, e.g., upon coupling or decoupling of a drive unit or to shift a transmission, i.e., to change the transmission ratio of a transmission, a power or torque influence of the first drive unit and the further drive units takes place.

A change of the mechanical coupling of a drive unit typically takes place with the aid of friction-locked or form-locked clutches. Form-locked clutches typically may not be operated under load. They require completely load-free shifting, i.e., a torque influence up to the torque freedom of the drive unit and speed synchronization between the primary side and the secondary side of the clutch.

German Patent Application No. DE 101 26 348 A1 describes performing a torque influence of a further drive unit upon a change of the mechanical transmission ratio of a transmission of a first drive unit. During the shifting of the automated manual shift transmission on the main power train, the torque is equalized using a secondary system, so that no change of the acceleration is perceived by the driver. The difference between the torque requested by the driver and the torque achieved by the transmission is compensated for by the secondary system during shifting.

To change the coupling of a drive unit, which is designed as an electric machine, from an engaged first clutch to an engaged second clutch, the following steps are performed. A torque influence of the electric machine initially takes place, i.e., a torque reduction or a buildup is carried out in order to achieve the load-free condition. In a further step, the torque influence of the further drive unit is carried out simultaneously. This is carried out by the second drive unit by assuming the torque fraction reduced or built up at the electric machine, in order to continue to generate a predefined total setpoint torque. The first clutch is then disengaged. Subsequently, a speed synchronicity is produced on the primary side and the secondary side of the second clutch by torque influence or speed regulation of the electric machine, which corresponds to an active speed synchronization. If this speed synchronicity is achieved, the second clutch is engaged. The torque of the second drive unit is subsequently influenced in such a way that the reduction of the torque fraction built up by the electric machine takes place at the second drive unit (or vice versa), in order to continue to generate a predefined total setpoint torque. This corresponds to a redistribution of the torque from the second drive unit to the electric machine.

SUMMARY

In a method for changing the mechanical coupling of a drive unit to a power train of a motor vehicle, whose power train is equipped with at least two drive units, according to an example embodiment of the present invention, a change of the mechanical coupling of a drive unit is carried out for optimal comfort, emissions, and consumption with high driving safety of the vehicle. Because the change of the mechanical coupling of the first of the two drive units takes place in at least two operating modes, a first operating mode causing a slow operating point change of the two drive units with respect to time, while a more rapid operating point change of the two drive units with respect to time is made possible by a second operating mode, upon the change of the mechanical coupling of the first drive unit, a torque influence of the first drive unit and a torque influence of the at least one further drive unit are carried out. Through the use of two different operating modes, it is ensured that in one operating mode at least one of the two drive units is operated optimally, this optimum operation being taken into consideration in the torque influence of the other drive unit. In the second operating mode, such an optimum operating mode is not taken into consideration. A rapid response of the motor vehicle to a request to change the mechanical coupling of the first drive unit is thus achieved.

A change of the mechanical coupling is also understood, for example, as the performance of a shifting operation of a transmission. The change of the transmission ratio of the transmission is implemented, for example, by the change of gearwheel stages, via which one drive unit is coupled, or by adjusting the transmission ratio of a continuous transmission, the adjustment typically being accompanied by a torque influence of the drive units. The change of the mechanical coupling of the first drive unit also includes the change of the engagement point of the drive unit in the power train, for example, in that the power train is coupled to different transmission shafts as a function of the operating state of the power train. A change of the mechanical coupling of a drive unit is also understood, for example, as its decoupling from the power train in certain operating states of the power train, e.g., for reasons of efficiency, in order to avoid excess speeds or in the event of a defect of the drive unit. An example of this is a hybrid vehicle having two driven axles, one of which is exclusively driven by a first drive unit. The first drive unit is typically decoupled and shut down at high vehicle velocities. If the vehicle velocity decreases again below a threshold, the first drive unit is turned on and coupled in again, in conjunction with a torque influence of the drive units.

The operating point change of the two drive units is advantageously carried out approximately in opposite directions. In this way, it is achieved that a synchronicity (equal displacement) of the torque fraction reduced by one drive unit to the torque fraction built up by the other drive unit takes place. This has the result that this change of the mechanical coupling is not perceived by the vehicle occupants.

In one embodiment, during the first operating mode, at least one drive unit is operated at an optimum torque, this optimum torque of the drive unit being taken into consideration upon the torque influence of the other drive unit. The coupling may be changed during the travel of the motor vehicle, whereby a comfortable change of the coupling, in particular shifting, is made possible without repercussion on the motor vehicle.

In one refinement, the optimum torque is set as a function of the dynamics of the drive units. In the case of a gasoline engine having homogeneous combustion, for example, a base torque or a torque derived therefrom represents an optimum torque. During the load-free shifting of the first drive unit, the gasoline engine is operated at the optimum torque (base torque). For the load-free shifting, the optimum torque of the gasoline engine is influenced in such a way that it adapts to the predefined total setpoint torque. The torque of the first drive unit is influenced in such a way that it assumes the difference between the predefined total setpoint torque and the optimum torque of the gasoline engine and runs toward zero. The transmission ratios must be taken into consideration. Ignition angle interventions or cylinder cut-offs, which worsen the efficiency or the emission behavior, may be avoided. At the optimum torque, the drive unit and assigned components, such as an electrical energy store, a catalytic converter, or a turbocharger, may be operated optimally with respect to consumption, emissions, and service life (without overload), for example.

In another variant, the optimum torque is set as a function of the dynamics of the power train. Before changing the mechanical coupling of the first drive unit, the torque of the second drive unit is positive and that of the first drive unit is negative. The predefined total setpoint torque is also negative. During the load-free shifting of the first drive unit, a zero crossing in the torque of the second drive unit results, since it must generate the negative total setpoint torque alone in the case of the load-free first drive unit. The power train passes through mechanical slack points or play, which may result in a jerk in the power train and unpleasant noises. The application of the optimum torque to the second drive unit is predefined in such a way that it makes a corresponding zero crossing "soft," whereby unpleasant noises or a jerk in the power train are prevented. A soft design of the zero crossing is implemented, for example, by a limited gradient of the optimum torque, i.e., a limited change speed with respect to time, in the area of the zero crossing, which then approaches the predefined total setpoint torque. The torque of the first drive unit is influenced in such a way that it assumes the difference between the predefined total setpoint torque and the optimum torque of the second drive unit, i.e., it runs toward zero.

In one refinement, the optimum torque is set as a function of the dynamics of the entire motor vehicle. This has the advantage that, if the first drive unit drives one axle or one wheel of the vehicle, and further drive units drive a further wheel or a further axle, movements of the vehicle structure and the self-steering effect of the vehicle are taken into consideration during the torque influence of the drive units. Redistributions between the axles or wheels are not carried out suddenly, whereby unpleasant movements of the vehicle structures as a result of the kinematics of the wheel suspensions or the self-steering effect, which is unfamiliar to the driver, e.g., when rapidly negotiating curves, may be avoided. The optimum torque according to the present invention is therefore limited in its dynamics. The maximum permissible dynamics may be ascertained on the basis of road tests, for example, and depends on the instantaneous driving state (vehicle velocity, vehicle transverse acceleration, estimated coefficient of friction between tires and roadway surface, loading of the vehicle, and similar variables).

In particular when considering the dynamics of the drive unit, this may result in inadequate torque influence of the first drive unit. For the load-free shifting of the first drive unit, the optimum torque of the second drive unit is influenced in such a way that it adapts to the predefined total setpoint torque. In the case of a dynamic curve of the total setpoint torque, this is not always completely possible, e.g., if the optimum torque only follows the preset with a delay. If the torque of the first drive unit compensates for the difference between the predefined total setpoint torque and the optimum torque of the second drive unit, in this case it does not completely run toward zero.

In one refinement, a permitted range delimits the torque of a drive unit during the change of the mechanical coupling of the first drive unit. Such a delimitation of the torque of the drive unit by the permitted range results in a deviation from the optimum torque and/or from the predefined total setpoint torque. It is thus ensured that only the permitted range is used in the event of a change of the coupling, in particular of the transmission ratio.

In one embodiment, the permitted range of the torque of the drive unit is reduced or increased, in that the limiting values are increased or decreased or the curve of the boundary is adapted, for example, so that the torque of the drive unit runs jump-free. It is thus ensured that no jumps are induced in the torque of the drive unit.

In one variant, the torque exceeds or falls below the optimum torque of the at least one drive unit in the second operating mode during the change of the mechanical coupling of the first drive unit. This has the result that during strong vehicle accelerations or braking maneuvers, rapid decoupling or change of the mechanical coupling of the first drive unit is possible, in order to prevent overspeeds and therefore mechanical damage, which may result in critical driving stability under certain circumstances. Such a rapid decoupling may also be necessary in the event of a defect of a drive unit. To avoid a safety-critical driving state, rapid decoupling or change of the mechanical coupling of the first drive unit may also be necessary, e.g., to provide an ESP intervention. A rapid change of the mechanical coupling may be necessary to generate the maximum possible total torque as rapidly as possible when the accelerator pedal is pressed down completely by the driver (kick-down), e.g., during a passing maneuver. The second operating mode therefore allows a more rapid change of the mechanical coupling, during which the optimum torque and/or the predefined total setpoint torque is not maintained, i.e., the torque exceeds or falls below it.

In the case of a positively predefined, i.e., driving total setpoint torque, a safety-critical increase or so-called self-acceleration of the vehicle is advantageously avoided in that the torque only falls below the total setpoint torque.

Alternatively, in the case of a negatively predefined, i.e., braking total setpoint torque, a safety-critical reduction and therefore intensified braking are avoided in that the total setpoint torque is only exceeded.

The dynamic response of the change of the mechanical coupling is increased by leaving the optimum torque, which is necessary in selected operating states.

A synchronous speed is advantageously set on the first drive unit by a speed regulation. Loss torques and the torques required for accelerating an inertial mass of the first drive unit and the inertial masses of coupled drive parts are preferably pilot controlled in order to improve the speed regulation.

In one refinement, the present invention relates to a vehicle control unit, which activates at least two drive units. In order to allow a reliable change of the mechanical coupling of the first drive unit from a first coupling to a second coupling, in particular from a first transmission ratio to a second transmission ratio, during the travel of the motor vehicle, an arrangement is provided which sets a change of the mechanical coupling of the first of the two drive units in at least two operating modes, a first operating mode causing a slow operating point change of the two drive units with respect to time, while a more rapid operating point change of the two drive units with respect to time takes place in a second operating mode, thereby adapting the change of the coupling to the particular instantaneous operating state of the vehicle. In particular in the second operating mode, the dynamic response of the vehicle is supported further, while in the case of the setting of the optimum torque in the first operating mode, an optimum adaptation of the torques of the two drive units is made possible.

The arrangement advantageously receive a request signal to request the first or second operating mode and/or to change over between the first operating mode and the second operating mode. The vehicle control unit communicates with a further control unit, for example, a transmission control unit, which requests one operating mode or decides when a changeover is to be made from a first operating mode into the second operating mode and back.

In one embodiment, the arrangement outputs a confirmation signal after setting a first or second operating state by activating the first or second drive unit in the first or second operating mode, in particular in a defined period of time, and cancel out the first or second operating mode on the two drive units again after receiving an execution signal after the completed change of the mechanical coupling, transmission ratio, and/or synchronization of the first drive unit.

The vehicle control unit therefore controls the electronics, which set the corresponding torques on the first drive unit or the second drive unit. The vehicle control unit sets up a load-free condition of the first drive unit upon receiving a request signal, for example, in accordance with the first operating state or the second operating state, and then outputs a confirmation signal. The change of the coupling is limited to a certain period of time in particular by the specification of a maximum duration, within which a torque influence or a load-free condition of the first drive unit must take place completely.

A further refinement of the present invention relates to a transmission control unit, which activates a transmission, which includes at least one clutch, to shift the mechanical coupling of a first drive unit. In order to also implement in this transmission control unit a reliable setting and change of the coupling of the first drive unit depending on the operating state of the motor vehicle, an arrangement is provided which output a request signal for setting the first operating mode or the second operating mode. This request signal is received by the vehicle control unit, the control units being able to output signals among one another, which each confirm the receipt of a signal from the other control unit. This is a so-called handshake between the transmission control unit, and the vehicle control unit.

In one embodiment, the arrangement outputs a defined duration for setting the first or second operating state with the request signal. The functions of the individual control units are thus adapted to one another.

In one variant, the arrangement receives a confirmation signal, which reports the correct setting of the first or second operating state. Therefore, after the fully completed torque influence, the load-free condition of the first drive unit is reported and the change of the mechanical coupling and/or a synchronization by the transmission control unit is initiated.

In one refinement, the arrangement outputs an execution signal after the complete change of the mechanical coupling or the synchronization of the first drive unit. Following this signal, the torque influence or the load-free condition of the first drive unit is cancelled or ended by the vehicle control unit. A normal state is therefore assumed again.

BRIEF DESCRIPTION OF THE DRAWINGS

The present invention permits numerous specific embodiments. An example is explained below in greater detail on the basis of the figures.

DETAILED DESCRIPTION OF EXAMPLE EMBODIMENTS

Figure 1:
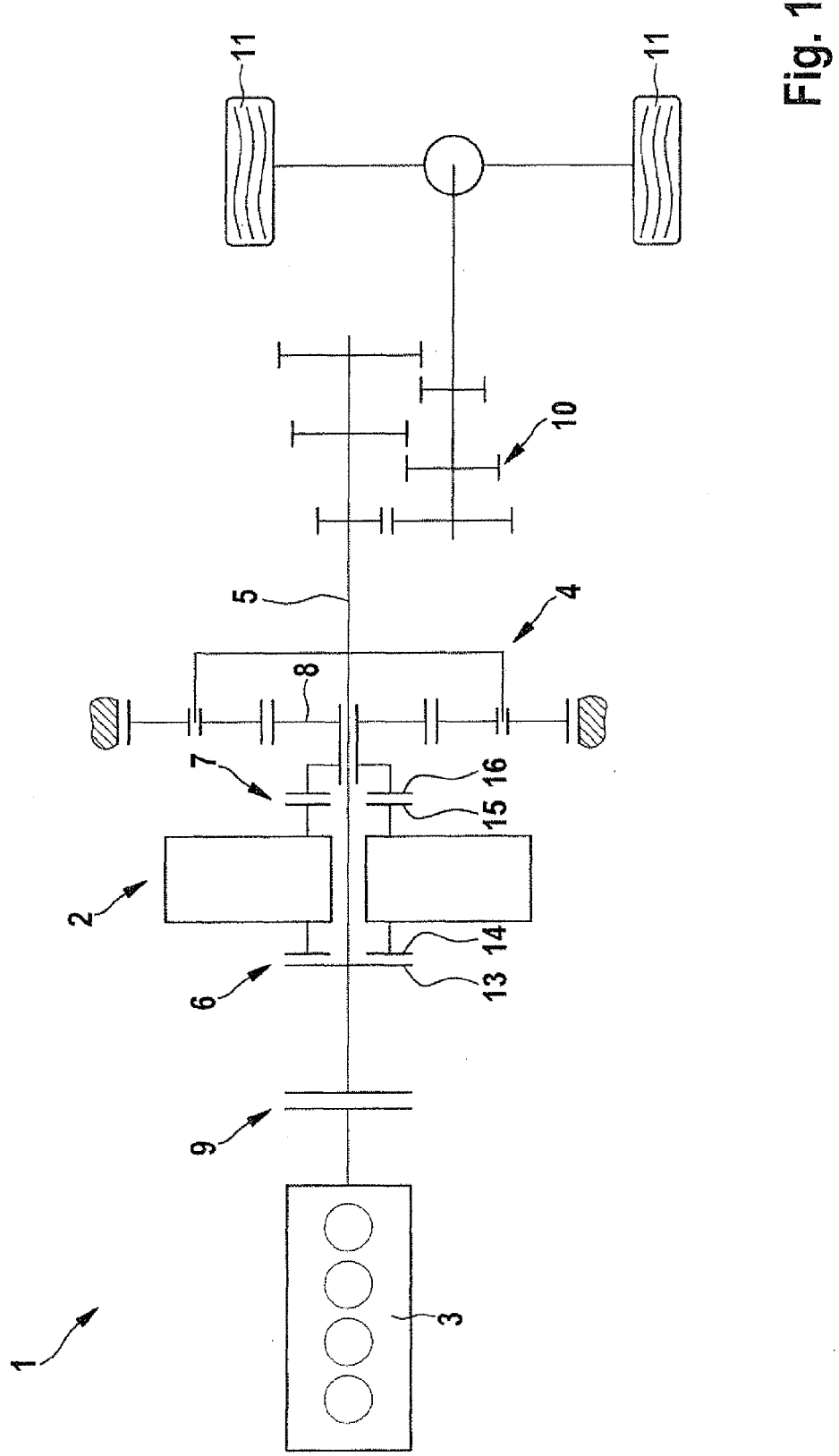
FIG. 1 shows a schematic view of a power train of a hybrid vehicle.

Identical features are identified by identical reference numerals.

FIG. 1 shows a power train 1 of a hybrid vehicle, in which the torques of an electric machine 2 as the first drive unit and an internal combustion engine 3 as the second drive unit are added together. Electric machine 2 acts directly or via a planetary gear 4 on a transmission input shaft S. One of these two couplings is selected by engaging one of the two form-locked clutches 6, 7. When clutch 6 is engaged, electric machine 2 acts directly on transmission input shaft S. When clutch 7 is engaged, it acts on sun wheel 8 of planetary gear 4 and therefore with a transmission ratio≠1 on transmission input shaft 5. The web of planetary gear 4 is connected to transmission input shaft 5 and the hollow wheel of planetary gear 4 is connected to the transmission housing. A starting clutch 9 is additionally also provided. Multiple transmission gear stages 10 may produce a connection to the drive wheels 11 of the motor vehicle.

An engaged starting clutch 9 with fixed selected transmission gear stages 10 is presumed hereafter. For better understanding of FIG. 1, it is to be noted that electric machine 2 is situated concentrically to transmission input shaft 5, which is connected via starting clutch 9 to internal combustion engine 3. Primary side 13 of first clutch 6 is connected in a rotationally fixed manner to transmission input shaft 5, while secondary side 14, which is also situated concentrically to transmission input shaft 5, is fixedly connected to electric machine 2.

To change the coupling of electric machine 2, or to change transmission ratio iEIM, using which electric machine 2 is coupled on, the sequence proceeds from an engaged clutch 6 to an engaged clutch 7 using the following steps:

A torque influence of electric machine 2 initially takes place, which means that a torque reduction takes place at electric machine 2 to set the load-free condition on clutch 6. Internal combustion engine 3 assumes the torque fraction reduced at electric machine 2, in order to continue to generate a predefined total setpoint torque. Clutch 6 is then disengaged. A speed synchronization is then produced on primary side and secondary side 15 and 16 of clutch 7 by a torque influence or speed regulation of electric machine 2. Clutch 7 is then engaged.

A further torque influence takes place thereupon at electric machine 2 in the form of the torque buildup. A torque reduction takes place simultaneously at internal combustion engine 3. The torque fraction reduced at internal combustion engine 3 corresponds, in consideration of transmission ratio iEIM≠1, to the torque fraction built up by electric machine 2, in order to continue to generate a predefined total setpoint torque.

Figure 2:
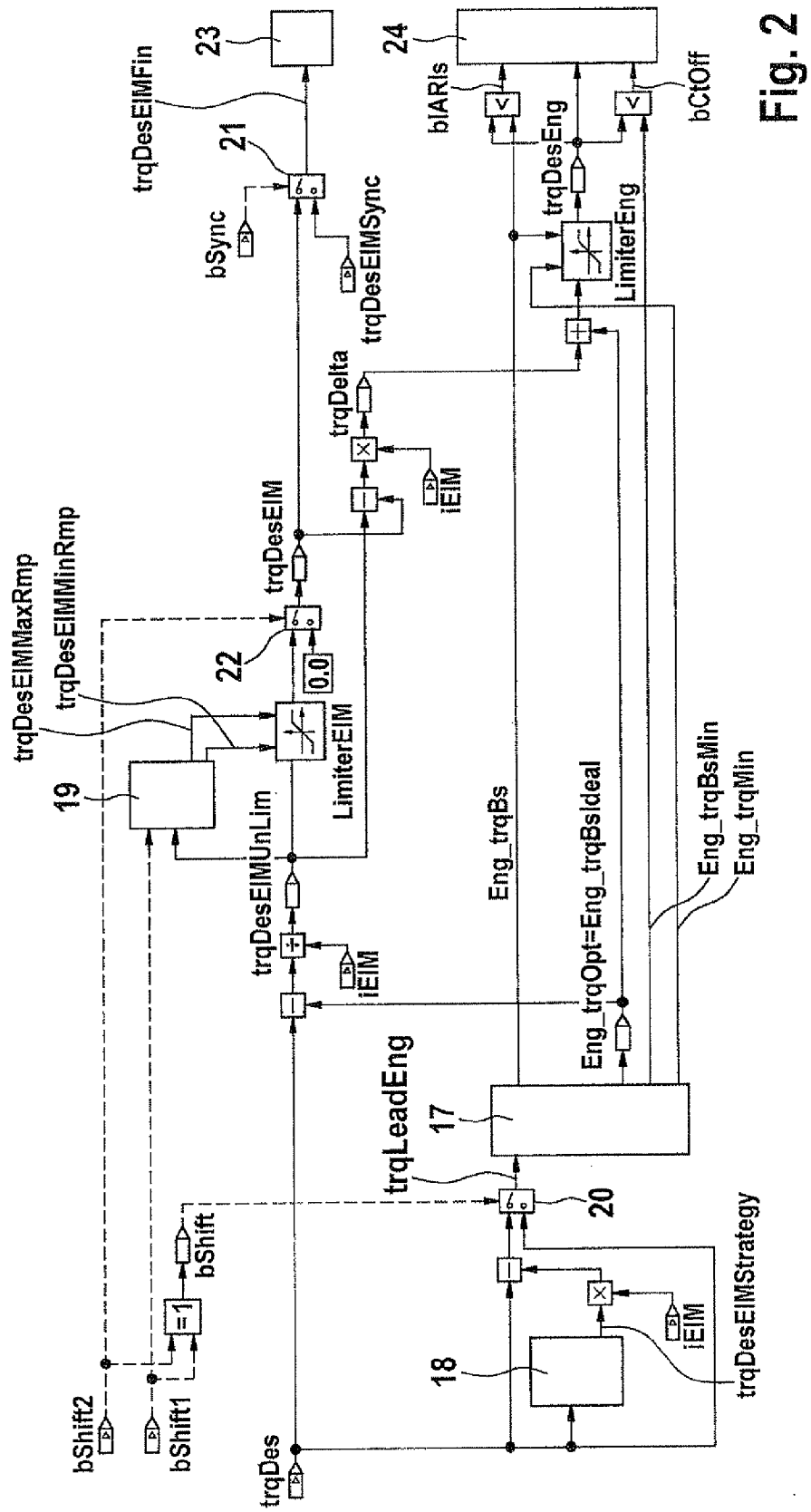
FIG. 2 shows a signal flow chart for the power train according to FIG. 1.

FIG. 2 shows a signal flow chart for power train 1 according to FIG. 1. Internal combustion engine 3 is a gasoline engine having homogeneous combustion and an electronic throttle valve for air mass flow rate regulation. The finite setting speed of the throttle valve and dynamic filling effects in the intake manifold of internal combustion engine 3 do not permit highly dynamic setting of a predefined air mass flow rate and the internal combustion engine torque generated thereby. A lead setpoint torque trqLeadEng for internal combustion engine 3 acts on the slow air path. In ideal operation, at an ideal ignition angle, internal combustion engine 3 generates an ideal base torque Eng_trqBsIdeal, which follows lead setpoint torque trqLeadEng. The transition from lead setpoint torque trqLeadEng to ideal base torque Eng_trqBsIdeal, i.e., the air path dynamics, is simulated in block 17 with the aid of a series circuit of a response-time element and a first-order delay element.

In contrast, an intervention in the ignition angle and therefore a modification of the internal combustion engine torque may take place nearly without delay. A second setpoint torque trqDesEng for internal combustion engine 3 acts on the rapid ignition angle path. By retarding the ignition angle in relation to the ideal ignition angle, the efficiency of internal combustion engine 3 is worsened, which has a negative effect on the fuel consumption. The actual torque of internal combustion engine 3 decreases in relation to ideal base torque Eng_trqBsIdeal. A torque reduction by retarding the ignition angle is only possible down to minimum base torque Eng_trqBsMin, which is given by the combustibility limit. A further torque reduction may take place by injection cutoff of individual cylinders; however, this is associated with increased exhaust gas emissions. The actual torque of internal combustion engine 3 may be reduced by injection cutoff of all cylinders down to minimum torque Eng_trqMin, which corresponds to the loss torque of internal combustion engine 3.

If torque reserves are present, e.g., for heating a catalytic converter, the actual torque of internal combustion engine 3 may be increased up to base torque Eng_trqBs under certain circumstances by advancing the ignition angle. If no torque reserves are present, ideal base torque Eng_trqBsIdeal and base torque Eng_trqBs decrease together.

The following equation applies for the torque limits:

Eng_trqMin<Eng_trqBsMin<Eng_trqBsIdeal≤Eng_trqBs.

According to FIG. 2, ideal base torque Eng_trqBsIdeal corresponds to an optimum torque Eng_trqOpt of internal combustion engine 3. The least possible emissions and least possible consumption exist when internal combustion engine 3 is operated at ideal base torque Eng_trqBsIdeal. Deviations are accompanied by various disadvantages with respect to fuel consumption, i.e., efficiency, and exhaust gas emissions and are to be avoided.

The engine controller ascertains the instantaneous actual torque and the torque limits (base torque Eng_trqBs, ideal base torque Eng_trqBsIdeal, minimum base torque Eng_trqBsMin, and minimum torque Eng_trqMin) on the basis of measured or estimated variables, in the case of a gasoline engine having intake manifold injection, e.g., from engine speed, intake manifold pressure, ignition point, and excess air ratio λ.

In block 18, a strategy setpoint torque trqDesEIMStrategy, which is to be maintained in normal operation of electric machine 2 in the chronological mean, is ascertained from total setpoint torque trqDes. Strategy setpoint torque trqDesEIMStrategy is a function of the current state of a vehicle electrical system, including an electrical energy store, and the speeds of electric machine 2 and internal combustion engine 3 or selected transmission ratio iEIM between electric machine 2 and internal combustion engine 3.

In normal operation, strategy setpoint torque trqDesEIMStrategy is converted using transmission ratio iEIM and added with a negative sign to total setpoint torque trqDes. Lead setpoint torque trqLeadEng for internal combustion engine 3 results. Internal combustion engine 3 therefore generates total setpoint torque trqDes and additionally drives electric machine 2, which typically operates as a generator in the case of negative strategy setpoint torque trqDesEIMStrategy. Ideal base torque Eng_trqBsIdeal and therefore optimum torque Eng_trqOpt of internal combustion engine 3 follow lead setpoint torque trqLeadEng somewhat delayed due to the air driving dynamics.

An unlimited setpoint torque trqDesEIMUnLim of electric machine 3 results from the difference between total setpoint torque trqDes and optimum torque Eng_trqOpt of internal combustion engine 3, converted using transmission ratio iEIM. Unlimited setpoint torque trqDesEIMUnLim of electric machine 2 is limited by both limits trqDesEIMMaxRmp and trqDesEIMMinRmp, which are ascertained in block 19. A first setpoint torque trqDesEIM for electric machine 2 results. During normal operation, both limits trqDesEIMMaxRmp and trqDesEIMMinRmp are a function of the current operating limits of electric machine 2, the vehicle electrical system, and the electrical energy store.

In a first operating mode, the change of the mechanical coupling, in particular transmission ratio iEIM, of electric machine 2 begins in that a binary signal bShift1 is set to true. Therefore a derived signal also becomes bShift=true, which results through an OR linkage with a further binary signal bShift2. A switch 20 goes into the lower position and switches total setpoint torque trqDes to lead setpoint torque trqLeadEng for internal combustion engine 3. Therefore, a generation of total setpoint torque trqDes solely by internal combustion engine 3 begins. Optimum torque Eng_trqOpt runs toward total setpoint torque trqDes. However, electric machine 2 is not immediately switched load-free. Unlimited setpoint torque trqDesEIMUnLim of electric machine 2 only decreases to the extent to which optimum torque Eng_trqOpt of internal combustion engine 3 approaches total setpoint torque trqDes. This is achieved by forming the difference between total setpoint torque trqDes and optimum torque Eng_trqOpt of internal combustion engine 3.

A strongly dynamic total setpoint torque trqDes may not immediately follow optimum torque Eng_trqOpt of internal combustion engine 3 due to the air path dynamics. Unlimited setpoint torque trqDesEIMUnLim of electric machine 2 will not remain completely at 0 Nm. Therefore, in the case of bShift1=true, both limits trqDesEIMMaxRmp and trqDesEIMMinRmp are brought to 0 Nm, preferably in such a way that no jumps are generated in first setpoint torque trqDesEIM for electric machine 2. For example, this is achieved in such a way that the limits are brought to 0 Nm in a ramped form within a predefined time (e.g., 400 ms). Electric machine 2 is then load-free.

A differential torque trqDelta is shown in FIG. 2, which results from unlimited setpoint torque trqDesEIMUnLim of electric machine 2 minus first setpoint torque trqDesEIM for electric machine 2, converted using transmission ratio iEIM. A torque fraction which is not representable by electric machine 2 in the case of limiting by trqDesEIMMaxRmp and trqDesEIMMinRmp is therefore applied to second setpoint torque trqDesEng of internal combustion engine 3. Second setpoint torque trqDesEng for internal combustion engine 3 moves away from optimum torque Eng_trqOpt of internal combustion engine 3, in conjunction with an intervention in the ignition angle or an injection cutoff. This is indicated by binary signals bIARIs and bCtOff in block 24. The application of differential torque trqDelta ensures that maintaining total setpoint torque trqDes receives higher priority than setting optimum torque Eng_trqOpt of internal combustion engine 3. The priority changes by leaving out the application; mixed forms are also possible. Maintaining total setpoint torque trqDes is important, since otherwise the risk of unintentional acceleration of the vehicle exists.

At an absolutely load-free condition of electric machine 2, i.e., at a first setpoint torque of trqDesEIM=0 Nm, a synchronization setpoint torque trqDesEIMSync is predefined for electric machine 2 as final setpoint torque trqDesEIMFin. This takes place by turning switch 21 at binary signal bSync=true. Synchronization setpoint torque trqDesEIMSync contains torque fractions of a speed regulation and pilot control fractions, whose calculation is not shown in FIG. 2.

After completing synchronization and change of the mechanical coupling, binary signal bSync=false is set and a load is again applied to electric machine 2. This begins in that binary signal bShift1 and therefore derived signal bShift are set to false. Both limits trqDesEIMMaxRmp and trqDesEIMMinRmp are brought to the values applicable in normal operation. This takes place preferably in such a way that no jumps are generated in first setpoint torque trqDesEIM for electric machine 2. Internal combustion engine 3 is preferably operated at optimum torque Eng_trqOpt.

A second operating mode for changing the mechanical coupling of electric machine 2 begins in that a binary signal bShift2 is set to true. This may take place from normal operation, i.e., when binary signal bShift1 is previously equal to false. Also, the derived signal becomes bShift=true, switch 20 goes into the lower position and switches total setpoint torque trqDes to lead setpoint torque trqLeadEng for internal combustion engine 3. A generation of total setpoint torque trqDes is therefore exclusively initiated by internal combustion engine 3. In contrast to the first operating mode, the first setpoint torque of electric machine 2 is suddenly switched to trqDesEIM=0 Nm if bShift2=true. Electric machine 2 is immediately load-free. This takes place with the aid of switch 22, which reacts to binary signal bShift2. A differential torque trqDelta=0 Nm results. Second setpoint torque trqDesEng of internal combustion engine 3 moves away suddenly from optimum torque Eng_trqOpt of internal combustion engine 3. By turning switch 21 as a result of binary signal bSync=true, the synchronization may then begin.

The second operating mode may also be requested from the first operating mode, e.g., if the risk of excess speed threatens or there is a defect of a drive unit. Alternatively thereto, a more rapid time sequence in the case of a coupling change or a decoupling of electric machine 2 may be achieved in the first operating mode by more rapid change of both limits trqDesEIMMaxRmp and trqDesEIMMinRmp to 0 Nm.

The change of the mechanical coupling and the synchronization may be initiated by signals of a transmission control unit (not shown in greater detail), for example. The transmission control unit may select and request one of the possible operating modes, for example. Preferably, an absolutely load-free condition of electric machine 2 is reported to the transmission control unit by the vehicle control unit, so that it may then initiate the further sequence. The transmission control unit reports back the ending of a synchronization or a change of a mechanical coupling to the vehicle control unit, upon which it activates electric machine 2 in such a way that electric machine 2 may again accept load or contribute to total setpoint torque trqDes.

Figure 3:
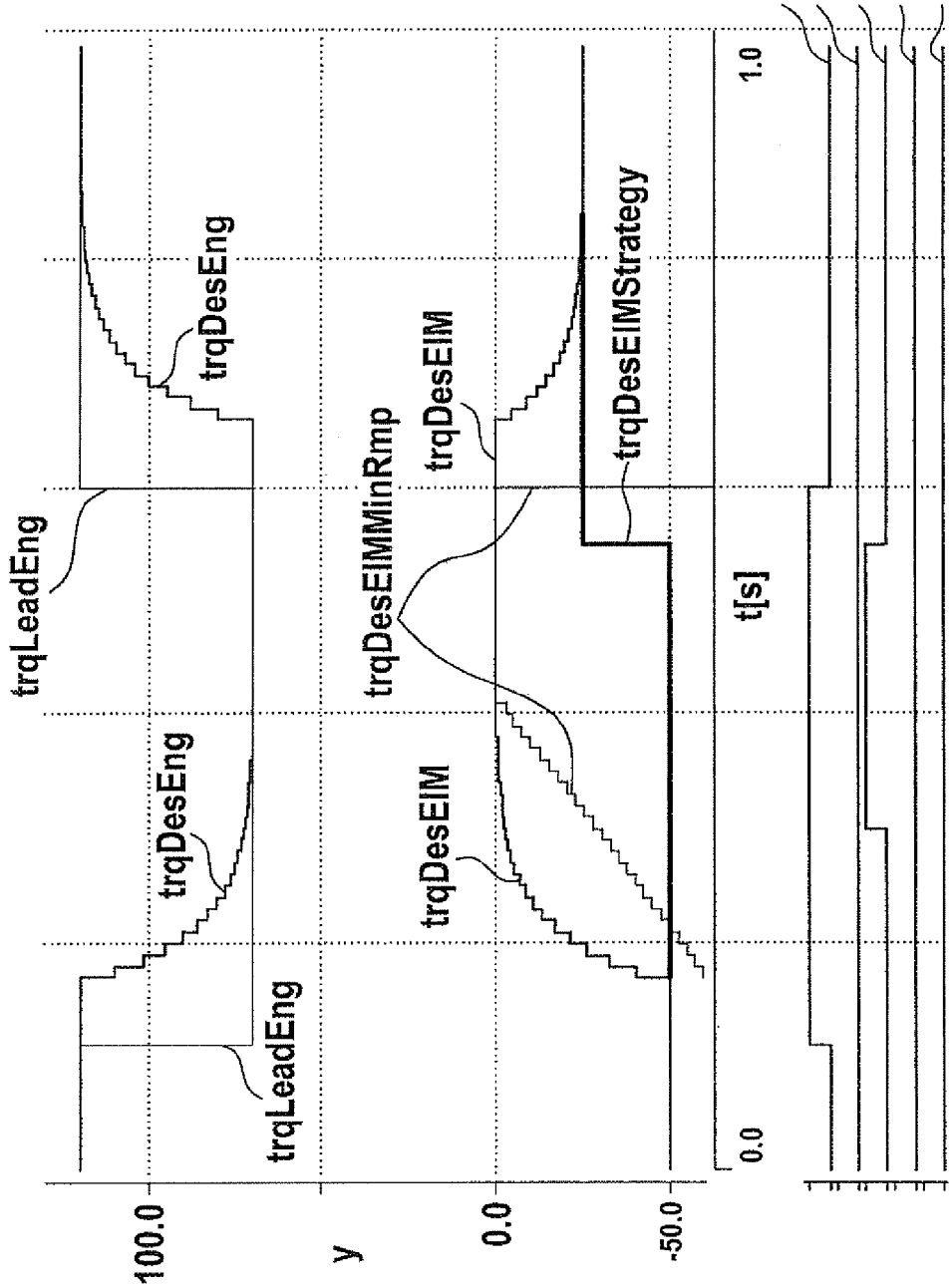
FIG. 3 shows a first simulation result for the power train according to FIG. 1.
Figure 4:
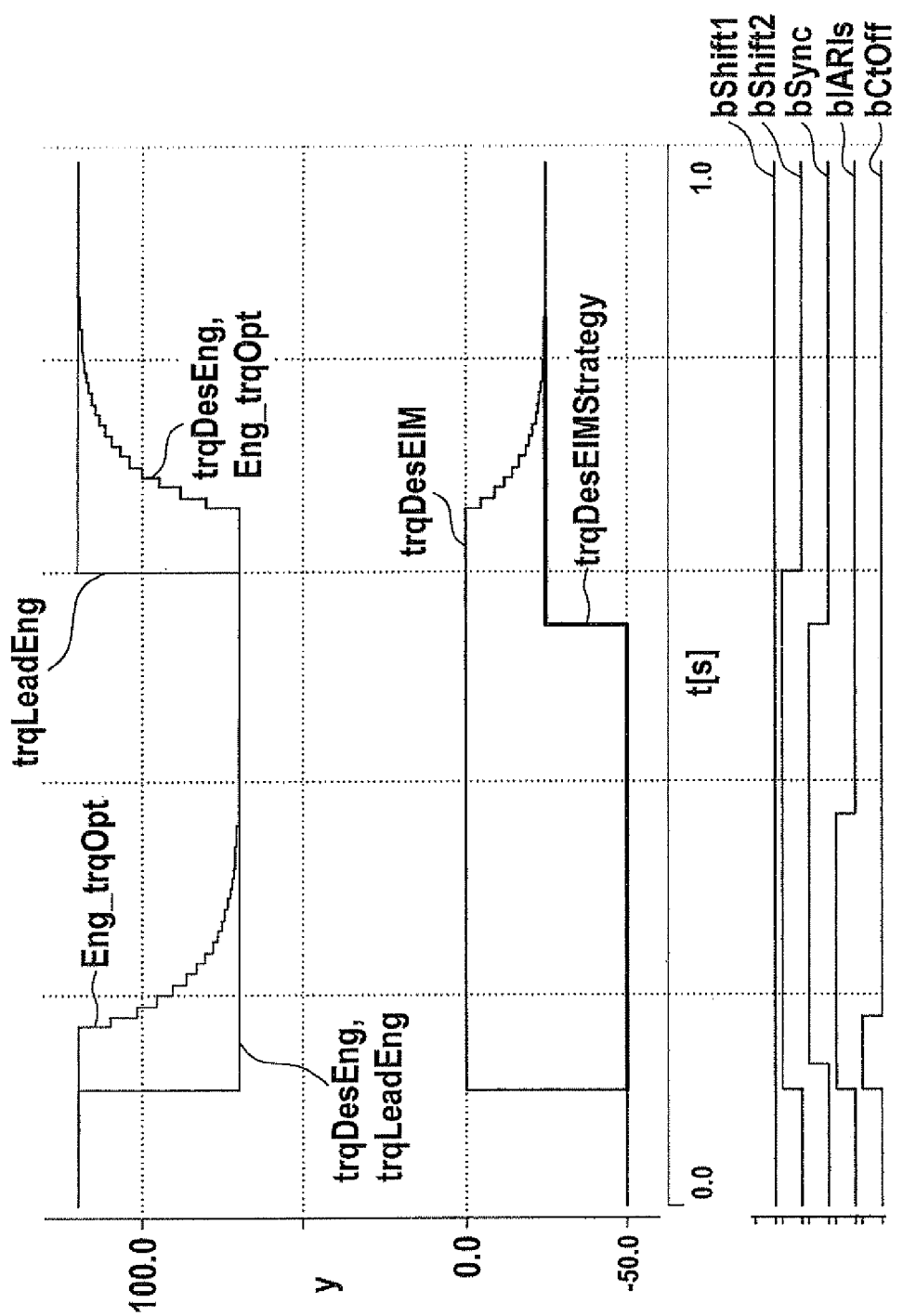
FIG. 4 shows a second simulation result for the power train according to FIG. 1.

Simulation results of the above-described exemplary embodiments are shown in FIGS. 3 and 4. An engaged starting clutch 9 and a fixed selected transmission gear stage 10 are presumed. At the beginning of the simulation, clutch 6 is engaged and the transmission ratio is therefore iEIM=1. During the simulation, a change of the mechanical coupling takes place, in particular of the transmission ratio to iEIM=2, by disengaging clutch 6 and engaging clutch 7. For the entire time range, the total setpoint torque is trqDes=70 Nm; at the beginning of the simulation, the strategy setpoint torque is trqDesEIMStrategy=−50 Nm, and it is adapted to −25 Nm upon change of the transmission ratio to iEIM=2.

FIG. 3 shows a simulation of the first operating mode. At the point in time of the rising flank of binary signal bShift1, unlimited setpoint torque trqDesEIMUnLim of electric machine 2 is negative. Upper limit trqDesEIMMaxRmp is therefore suddenly set to 0 Nm, without influencing first setpoint torque trqDesEIM of electric machine 2. Lower limit trqDesEIMMinRmp jumps, up to a distance of 25 Nm, toward unlimited setpoint torque trqDesEIMUnLim of electric machine 2 and then runs in a ramped manner down to 0 Nm. In the example, first setpoint torque trqDesEIM of electric machine 2 is also not influenced by lower limit trqDesEIMMinRmp. The differential torque remains at trqDelta=0 Nm. The synchronization begins at nearly load-free electric machine 2 with the rising flank of binary signal bSync. After completed synchronization and change of the mechanical coupling, the binary signal bSync=false is set. Load is then again applied to electric machine 2 with bShift1=false. During the entire operation, second setpoint torque trqDesEng of internal combustion engine 3 corresponds to optimum torque Eng_trqOpt of internal combustion engine 3. There is no intervention in the ignition angle and also no injection cutoff. Both binary signals bIARIs and bCtOff remain at false during the entire simulation. Internal combustion engine 3 is operated at optimum torque Eng_trqOpt according to the present invention. Predefined total setpoint torque trqDes is maintained during the entire operation or passed onto transmission input shaft 5 and the changing transmission ratio is taken into consideration. For the entire simulation in FIG. 3, bShift2=false.

FIG. 4 shows a simulation of the second operating mode. First setpoint torque trqDesEIM of electric machine 2 is suddenly switched to trqDesEIM=0 Nm at rising flank bShift2. Second setpoint torque trqDesEng for internal combustion engine 3 jumps downward together with lead setpoint torque trqLeadEng and moves away from optimum torque Eng_trqOpt. This results in a short-term cutoff of individual cylinders, characterized by binary signal bCtOff=true, and a somewhat longer-lasting intervention in the ignition angle using bIARIs=true. An ending of the torque influence is requested by bShift2=false. Second setpoint torque trqDesEng of internal combustion engine 3 follows optimum torque Eng_trqOpt. Predefined total setpoint torque trqDes is maintained during the entire operation. For the entire simulation in FIG. 4, bShift1=false.

In one refinement of the present invention, the change of the mechanical coupling of the first of both drive units 2, 3 takes place in a further operating mode, which causes a more rapid operating point change with respect to time of both drive units 2, 3 than in the first operating mode and a slower operating point change with respect to time than in the second operating mode. In this further operating mode, at least one drive unit 2, 3 is operated at a suboptimum torque. In contrast to the optimum torque, at which drive units 2, 3 and assigned components such as an electrical energy store, a catalytic converter, and a turbocharger, for example, are operated optimally with respect to consumption, emissions, and service life (without overload), restrictions take place here, for example, in that drive units 2, 3 and assigned components are operated optimally with respect to emissions and service life, but non-optimally with respect to consumption. In the case of an internal combustion engine 3 designed as a gasoline engine having homogeneous combustion, the suboptimum torque may be predefined by a torque range between base torque Eng_trqBs and minimum base torque Eng_trqBsMin, i.e., a range which is settable with the aid of an adjustment of the ignition angle but without injection cutoff of individual cylinders and therefore without increased exhaust gas emissions. For example, the suboptimum torque results in a slight jerk in the power train, which is still tolerable for comfort reasons, during the zero crossing as a result of mechanical loose points or play in the power train. Perceptible movements of the vehicle structure as a result of the kinematics of the wheel suspensions are also possible. A self-steering effect of the vehicle which is unfamiliar to the driver is avoided, however. A setting of the further operating mode or a changeover between the first, the second, and the further operating modes may be requested by a transmission control unit, for example.

What is claimed is:

1. A transmission control unit, which activates a transmission including at least one clutch for shifting a mechanical coupling of a first drive unit, comprising:
   an arrangement configured to output a request signal for setting a first or a second operating mode, or to change between the first and second operating modes, wherein the first operating mode causes a slower torque operating point change with respect to time of a torque produced by the first drive unit and the second operating mode causes a faster torque operating point change with respect to time of the torque produced by the first drive unit, wherein the arrangement is configured to output a defined duration for setting the first or second operating mode with the request signal within which a torque influence or a load-free condition of the first drive unit must take place completely, wherein each of the first and second torque operating point changes corresponds to reducing the torque produced by the first drive unit until the first drive unit is in a load-free condition.

2. The transmission control unit as recited in claim 1, wherein the arrangement is configured to receive a confirmation signal, which reports a correct setting of the first or second operating mode.

3. The transmission control unit as recited in claim 2, wherein the arrangement is configured to output an execution signal after a completed change of the mechanical coupling or synchronization of the first drive unit.

4. The transmission control unit as recited in claim 1, wherein:
   the request signal one of sets a third operating mode and changes from one of the first and second operating modes to the third operating mode, and
   the third operating mode causes an operating point change with respect to time of the first drive unit at a rate between the first and second operating modes.

* * * * *